United States Patent
Murayama

(10) Patent No.: US 9,476,351 B2
(45) Date of Patent: Oct. 25, 2016

(54) RECIRCULATION VALVE AND TURBOCHARGER

(71) Applicant: Tomokazu Murayama, Tokyo (JP)

(72) Inventor: Tomokazu Murayama, Tokyo (JP)

(73) Assignee: IHI CORPORATION (JP)

( * ) Notice: Subject to any disclaimer, the term of this patent is extended or adjusted under 35 U.S.C. 154(b) by 79 days.

(21) Appl. No.: 14/079,876

(22) Filed: Nov. 14, 2013

(65) Prior Publication Data

US 2014/0069096 A1 Mar. 13, 2014

Related U.S. Application Data

(63) Continuation of application No. PCT/JP2012/062273, filed on May 14, 2012.

(30) Foreign Application Priority Data

May 17, 2011 (JP) ................. 2011-110296

(51) Int. Cl.
F02B 33/00 (2006.01)
F02B 37/16 (2006.01)
F02B 39/00 (2006.01)
(Continued)

(52) U.S. Cl.
CPC ............. *F02B 37/16* (2013.01); *F02B 39/00* (2013.01); *F04D 25/024* (2013.01); *F04D 27/023* (2013.01); *F04D 27/0215* (2013.01); *F04D 29/4206* (2013.01); *F02M 26/06* (2016.02); *F05D 2220/40* (2013.01); *F05D 2250/52* (2013.01); *Y02T 10/144* (2013.01)

(58) Field of Classification Search
CPC ...... F02B 37/16; F02B 39/00; F04D 27/023; F04D 29/4206; F04D 27/0215

USPC ............... 60/611; 123/564; 251/88
See application file for complete search history.

(56) References Cited

U.S. PATENT DOCUMENTS 3,195,805 A * 7/1965 Cholvin et al. ............ 415/49
4,517,803 A * 5/1985 Jamison ................. 60/611
(Continued)

FOREIGN PATENT DOCUMENTS

CN 1900509 A 1/2007
DE 202009007233 U1 9/2009
(Continued)

OTHER PUBLICATIONS

Machine generated English translation of JP2004076787A (Published on Mar. 2004).*
(Continued)

*Primary Examiner* — Nicholas J Weiss
*Assistant Examiner* — Ngoc T Nguyen
(74) *Attorney, Agent, or Firm* — Ostrolenk Faber LLP

(57) ABSTRACT

Provided is a recirculation valve that diverts some of the compressed air in a scroll section to an upstream side of the scroll section via a bypass conduit in an open state and sends the compressed air in the scroll section to a downstream side in a closed state, the recirculation valve including a valve body that is fittable in a branch hole in which the scroll section communicates with the bypass conduit, and an actuator that moves the valve body between the closed state where the valve body is fitted in the branch hole and the open state where the valve body is away from the branch hole, in which the valve body forms an inner surface along an inner wall of the scroll section in the closed state.

14 Claims, 7 Drawing Sheets

(51) Int. Cl.
  *F04D 27/02* (2006.01)
  *F04D 25/02* (2006.01)
  *F04D 29/42* (2006.01)

(56) References Cited

U.S. PATENT DOCUMENTS

| | | | | |
|---|---|---|---|---|
| 5,137,003 A | * | 8/1992 | Kyoya et al. | 60/611 |
| 5,173,021 A | * | 12/1992 | Grainger et al. | 60/611 |
| 2003/0115870 A1 | * | 6/2003 | Finger et al. | 60/602 |

FOREIGN PATENT DOCUMENTS

| | | | | |
|---|---|---|---|---|
| GB | 2077354 A | * | 12/1981 | F04D 27/00 |
| JP | 4-082460 | | 7/1992 | |
| JP | 11-182257 | | 7/1999 | |
| JP | 2004-076787 | | 3/2004 | |
| JP | 2004-300965 | | 10/2004 | |
| JP | 2007-071207 | | 3/2007 | |
| JP | 2008-095572 | | 4/2008 | |
| JP | 2010-265854 | | 11/2010 | |
| WO | WO 98/30790 | | 7/1998 | |

OTHER PUBLICATIONS

European Search Report, dated Oct. 13, 2014, issued in corresponding European Patent Application No. EP12786338.9. Total 5 pages.
International Search Report dated Aug. 7, 2012 issued in corresponding International patent application No. PCT/JP2012/062273.
Office Action dated May 27, 2015 issued in corresponding Chinese Patent Application No. 201280023260.X (English translation of Search Report only).

* cited by examiner

RECIRCULATION VALVE AND TURBOCHARGER

This application is a Continuation of International Application No. PCT/JP2012/062273, filed on May 14, 2012, claiming priority based on Japanese Patent Application No. 2011-110296, filed May 17, 2011, the content of which is incorporated herein by reference in their entity.

TECHNICAL FIELD

The present invention relates to a recirculation valve and a turbocharger. More particularly, the present invention relates to a recirculation valve that is capable of suppressing pressure loss, and a turbocharger using the recirculation valve.

BACKGROUND ART

A turbocharger (for example, a turbocharger) is a device that increases the output of an engine by driving a turbine with the exhaust energy of the engine, driving a compressor coaxially linked to the axis of rotation thereof to compress air, and supplying high-density compressed air to the engine. A turbocharger in general includes a turbine housing that forms an outer shell of the turbine, a center housing (or a bearing housing) that rotatably supports the axis of rotation (or a shaft), and a compressor housing that forms an outer shell of the compressor. Also, the compressor housing has a scroll section which is formed in a spiral shape about the axis of rotation of an impeller of the compressor. The compressor compresses air taken in from an axial direction, supplies the compressed air from a circumferential end surface of the impeller to the scroll section, and discharges the compressed air out of the scroll section.

In the turbocharger (so-called turbocharger) that is mounted on a vehicle such as an automobile, an engine side is shifted to a low rotational state by an accelerator off signal in a case where the vehicle is rapidly decelerated from high-speed driving, and thus the compressed air in a scroll is less likely to be transferred to the engine. Also, the intake amount decreases due to the compressed air remaining in the scroll. However, since inertia causes the turbocharger to continue rotating, the compressor enters a surge state. In order to control the surge state, some turbochargers have a recirculation conduit that connects the scroll section of the compressor housing with an intake port of the compressor, and a recirculation valve that performs the opening and closing of the recirculation conduit. In this configuration, the recirculation valve is opened, the compressed air in the scroll section of the compressor housing is returned to the intake port of the compressor when the vehicle is rapidly decelerated (for example, refer to Patent Document 1 and Patent Document 2).

Patent Document 1 discloses the recirculation valve in which a valve seat is arranged in a casing of the turbocharger that is routable via a bypass passage, the bypass passage is closed by a seal lip when a valve unit is lowered onto the valve seat, and a discharge side of the turbocharger controlled by high pressure is separated from an intake side controlled by low pressure.

The Background Art section of Patent Document 2 discloses a configuration in which a bypass pipe connecting an intake pipe on a downstream side of the compressor of the turbocharger with an intake pipe on an upstream side, and a low pressure exhaust gas recirculation (EGR) system connecting an exhaust pipe on a downstream side of the turbine of the turbocharger with the intake pipe on the upstream side of the compressor of the turbocharger are arranged. The recirculation valve performing the opening and closing of the bypass pipe is arranged in the bypass pipe, and an EGR pipe connecting the exhaust pipe with the intake pipe, an EGR valve performing the opening and closing thereof, and an EGR cooler are arranged in the low pressure EGR system.

CITATION LIST

Patent Document

[Patent Document 1] Japanese Unexamined Patent Application, First Publication No. 2007-71207
[Patent Document 2] Japanese Unexamined Patent Application, First Publication No. 2010-265854

SUMMARY OF INVENTION

Technical Problem

However, the recirculation valve of above-described Patent Document 1 is arranged in the scroll section of the compressor housing in many cases, and a passage is formed to penetrate part of the scroll section and the recirculation valve is opened and closed outside the casing thereof. Therefore, in the turbocharger including the recirculation valve, a recessed space is present in part (inside the recirculation valve) of the scroll section, the flow of the compressed air is impeded, and thus there is a possibility that pressure loss might be generated and the operating efficiency of the turbocharger might decrease.

Also, in the turbocharger including the EGR system of above-described Patent Document 2, not only clean air from which dust and the like is removed by an air cleaner but also gas containing foreign materials such as blow-by gas and EGR gas is contained in the intake pipe on the upstream side of the compressor. The blow-by gas is gas that flows into the intake pipe via an oil separator from an engine main body, and contains oil mist and metal powder. The EGR gas is gas that flows into the intake pipe through the low pressure EGR system from an exhaust pipe, and contains soot and unburnt gas. Therefore, in the turbocharger including the recirculation valve, the recessed space is present in part (inside the recirculation valve) of the scroll section, the foreign materials contained in the above-described gas are likely to be accumulated and the recirculation conduit is likely to be mixed with foreign material.

The present invention has been made in view of the above circumstances, and an object thereof is to provide a recirculation valve and a turbocharger capable of suppressing pressure loss, inhibiting the recirculation conduit from being mixed with foreign materials, and improving the operating efficiency.

Solution to Problem

According to a first aspect of the present invention, there is provided a recirculation valve that diverts some of compressed air in a scroll section to an upstream side of the scroll section via a recirculation conduit in an open state and sends the compressed air in the scroll section to a downstream side in a closed state, the recirculation valve including a valve body that is fittable in a branch hole in which the scroll section communicates with the recirculation conduit, and an actuator that moves the valve body between the closed state where the valve body is fitted in the branch hole and the open state where the valve body is away from the branch hole, in which the valve body forms an inner surface along an inner wall of the scroll section in the closed state.

According to a second aspect of the present invention, there is provided a turbocharger including an exhaust gas turbine that rotates a moving blade with exhaust gas supplied from an engine, and a compressor that takes in air with an impeller that is coaxially connected to the moving blade, in which a compressor housing that forms an outer shell of the compressor has a scroll section which is formed in a spiral shape about an axis of rotation of the impeller, and the turbocharger further includes a recirculation valve that diverts some of the compressed air in a scroll section to an upstream side of the scroll section via a recirculation conduit in an open state and sends the compressed air in the scroll section to a downstream side in a closed state, the recirculation valve having a valve body that is fittable in a branch hole in which the scroll section communicates with the recirculation conduit, and an actuator that moves the valve body between the closed state where the valve body is fitted in the branch hole and the open state where the valve body is away from the branch hole, in which the valve body forms an inner surface along an inner wall of the scroll section in the closed state.

In the recirculation valve and the turbocharger according to the above-described first and second aspects of the present invention, the inner surface of the valve body may form one curved surface along with the inner wall of the scroll section, or to form a flat surface along the inner wall of the scroll section in the closed state. Also, the valve body may include a flange portion that is locked to an outer wall of the scroll section in the closed state.

The branch hole may include a conical surface whose diameter increases from the inner wall of the scroll section toward the outer wall, and the valve body may include an inclined surface that corresponds to the conical surface. Also, the branch hole may include a circular or rectangular columnar surface that extends from the inner wall of the scroll section toward the outer wall, and the valve body may include a side surface that corresponds to the columnar surface.

The valve body may include a tapered portion on a back surface, the diameter of the tapered portion increasing from a driving shaft of the actuator toward an outer edge portion of the valve body.

Advantageous Effects of Invention

According to the above-described recirculation valve and the turbocharger according to the present invention, the valve body is fitted in the branch hole and forms a conduit surface along the inner wall of the scroll section in the closed state of the recirculation conduit. Therefore, a recessed space in the scroll section can be buried to prevent pressure loss and foreign material accumulation, pressure loss can be suppressed, it is possible to inhibit the recirculation conduit from being mixed with foreign material, and the operating efficiency can be improved.

DESCRIPTION OF EMBODIMENTS

Hereinafter, embodiments of the present invention will be described with reference to FIGS. 1 to 6B.

Figure 1:
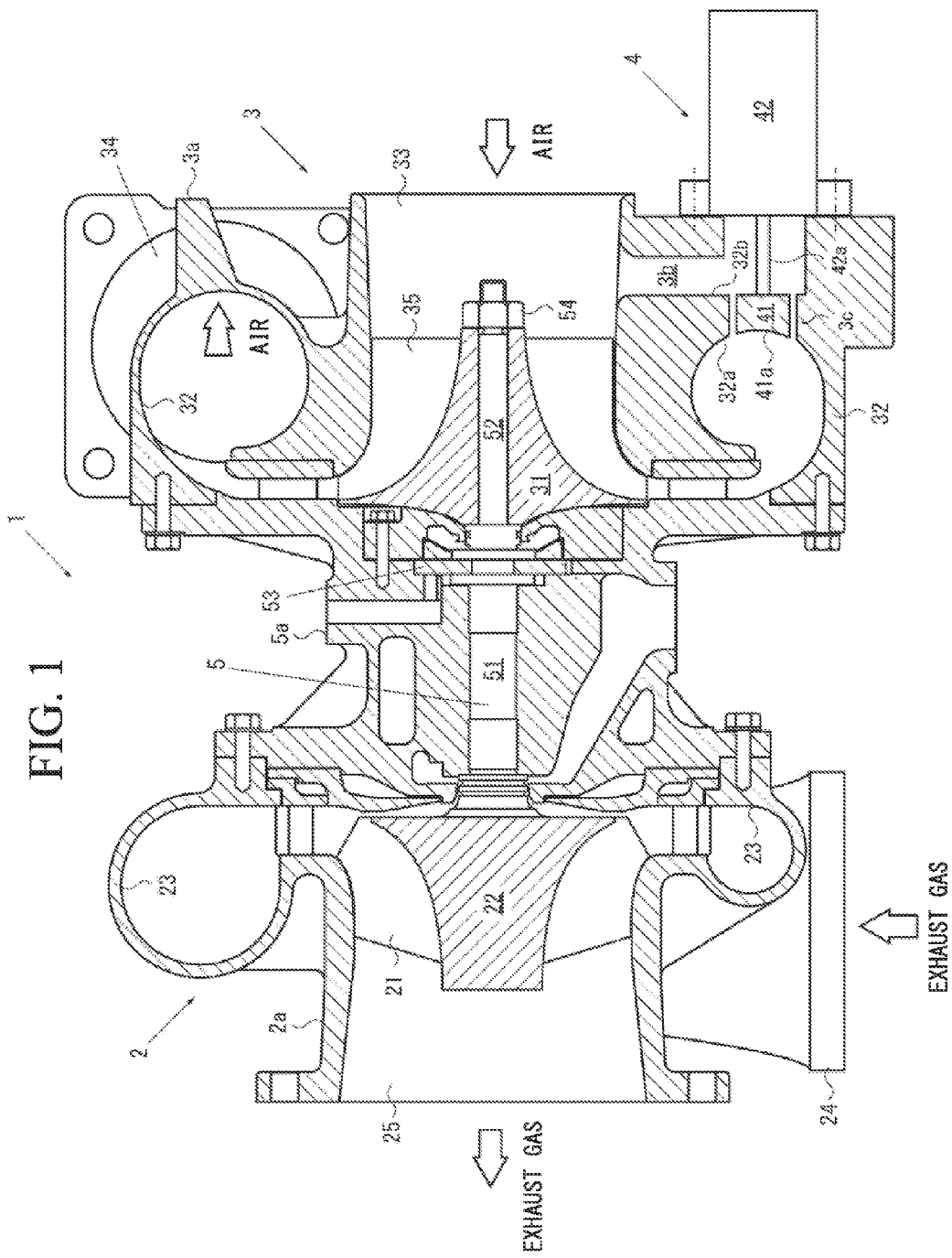
FIG. 1 is a cross-sectional view of a turbocharger according to a first embodiment of the present invention.
Figure 2:
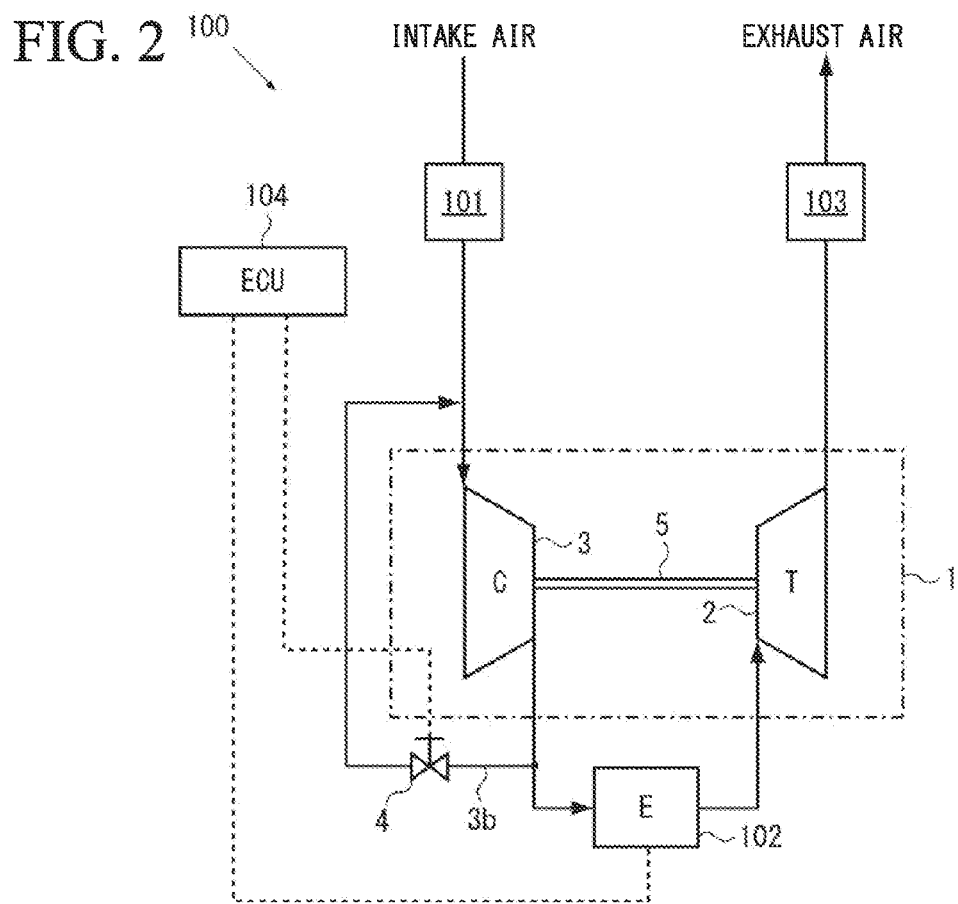
FIG. 2 is a configuration diagram of an engine driving system including the turbocharger illustrated in FIG. 1.

As illustrated in FIGS. 1 and 2, a turbocharger 1 according to a first embodiment of the present invention includes an exhaust gas turbine 2 that rotates moving blades 21 with exhaust gas supplied from an engine 102, and a compressor 3 that takes in air with an impeller 31 that is coaxially linked to the moving blades 21. A compressor housing 3a that forms an outer shell of the compressor 3 has a scroll section 32 which is formed in a spiral shape about an axis of rotation of the impeller 31. Also, in the compressor housing 3a, a recirculation valve 4 that diverts some of the compressed air in the scroll section 32 to an upstream side of the scroll section 32 via a recirculation conduit 3b in an open state and sends the compressed air in the scroll section 32 to a downstream side in a closed state is formed. The recirculation valve 4 has a valve body 41 that is configured to be fittable in a branch hole 3c in which the scroll section 32 communicates with the recirculation conduit 3b, and an actuator 42 that moves the valve body 41 between the closed state where the valve body 41 is fitted in the branch hole 3c and the open state where the valve body 41 is away from the branch hole 3c. The valve body 41 forms an inner surface 41a along an inner wall 32a of the scroll section 32 in the closed state.

The turbocharger 1 illustrated in FIG. 1 is an example of fluid machineries. The turbocharger 1 includes a turbine housing 2a that forms an outer shell of the exhaust gas turbine 2, a bearing housing 5a that rotatably supports a rotor shaft 5, and the compressor housing 3a that forms the outer shell of the compressor 3. The turbocharger 1 has the same configuration as, for example, vehicle turbochargers (so-called turbochargers) according to the related art.

The exhaust gas turbine 2 is a centrifugal turbine, and has a scroll section 23 that is formed in a spiral shape about an axis of rotation of a disk wheel 22 which has a plurality of moving blades 21, an exhaust gas inlet 24 that supplies the exhaust gas to the scroll section 23, and an exhaust gas outlet 25 that discharges the exhaust gas supplied to the disk wheel 22 in an extension direction of the rotor shaft 5.

The compressor 3 is a so-called centrifugal compressor, and has the scroll section 32 that is formed in a spiral shape about the axis of rotation of the impeller 31, an air inlet 33 that supplies air from the extension direction of the rotor shaft 5, and an air outlet 34 that discharges air compressed by the impeller 31 out of the scroll section 32. Also, on a surface of the impeller 31, a plurality of compressor impellers 35 is integrally formed by precision casting or the like. Also, the recirculation valve 4 is provided in part of the scroll section 32. When the recirculation valve 4 is opened, some of the compressed air in the scroll section 32 is diverted to the air inlet 33.

The rotor shaft 5 has a large diameter portion 51 and a small diameter portion 52, and one end of the large diameter portion 51 is joined to the disk wheel 22 and is integrated with the moving blades 21 after finishing, hardening treatment, and outer diameter grinding are performed as is the case with the related art. Also, between the large diameter portion 51 and the small diameter portion 52, a thrust collar 53 and the like are arranged to form a thrust bearing. The impeller 31 is fitted in the small diameter portion 52 of the rotor shaft 5, and fixed by a shaft end nut 54.

Also, as illustrated in FIG. 1, the turbocharger 1 is built into an engine driving system 100 illustrated in FIG. 2. As illustrated in FIG. 2, the engine driving system 100 includes an air cleaner 101 that removes fine foreign materials in intake air, the turbocharger 1 that compresses the intake air, the engine 102 that is driven by the compressed air and fuel, an after-treatment device 103 that removes harmful components generated in and discharged from a combustion chamber of the engine 102, and an electronic control unit (ECU) 104 that controls the turbocharger 1 and the engine 102.

The turbocharger 1 collects the energy of the exhaust gas using the exhaust gas turbine 2, puts the compressor 3 into operation, and supplies the compressed air to the engine 102 for an increase in output. Also, the opening and closing of the recirculation valve 4 that is arranged in the scroll section 32 of the compressor 3 is controlled by the electronic control unit 104. For example, in a state where a vehicle mounted with the engine driving system 100 is rapidly decelerated from high-speed driving, the electronic control unit 104 opens the recirculation valve 4 so as to suppress a surge state, and returns some of the compressed air in the scroll section 32 to the air inlet 33 side. In a normal state, the recirculation valve 4 is closed, and the entire compressed air in the scroll section 32 is supplied from the air outlet 34 to the engine 102.

The engine 102 is, for example, a diesel engine or a gasoline engine mounted on a vehicle. The engine 102 controls the amount of the compressed air and the fuel supplied depending on operating conditions. The control is performed by the electronic control unit 104. The engine 102 is controlled based on an air-fuel ratio (air mass/fuel mass). The air cleaner 101 is a device that removes the fine foreign materials in the air which is taken in from outside and supplies clean air to the turbocharger 1, and the after-treatment device 103 is a device that detoxifies the harmful components generated in and discharged from the combustion chamber of the engine 102 and discharges the result outside.

Figure 3A:
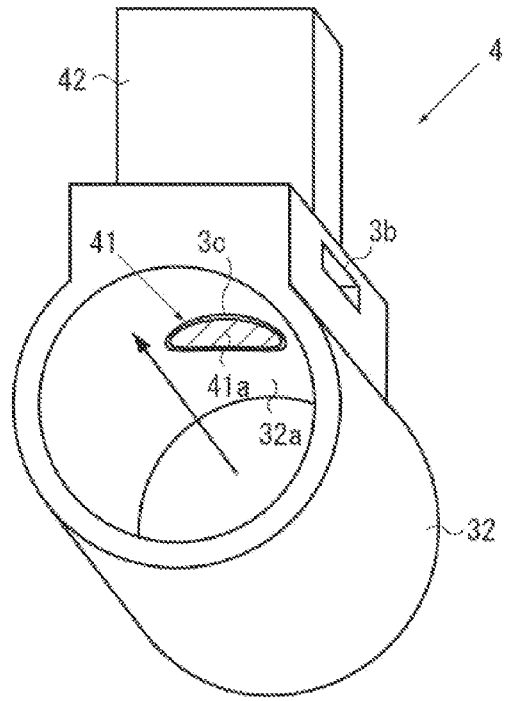
FIG. 3A is a perspective view of a recirculation valve illustrated in FIG. 1.

As illustrated in FIGS. 1 and 3A, the recirculation conduit 3b is formed in the compressor housing 3a, and the branch hole 3c is formed so as to communicate the recirculation conduit 3b with the scroll section 32. The recirculation valve 4 is connected to the compressor housing 3a so as to face the recirculation conduit 3b.

Figure 3B:
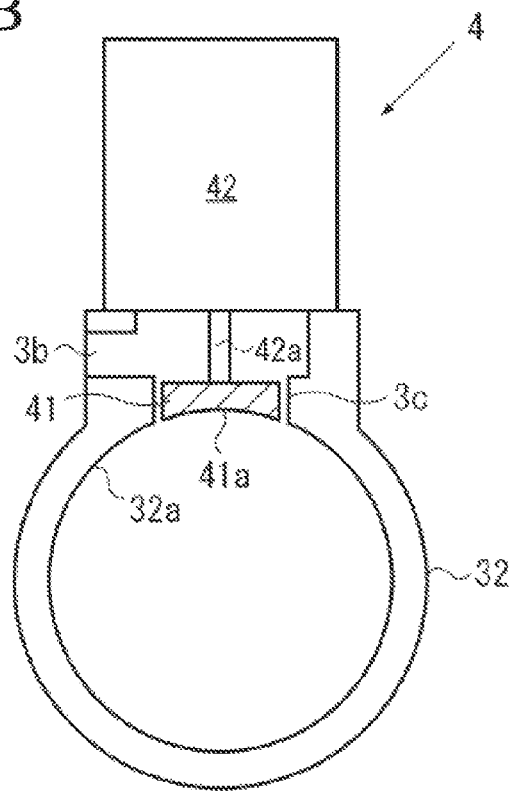
FIG. 3B is a cross-sectional view of the recirculation valve illustrated in FIG. 1 in a closed state.
Figure 3C:
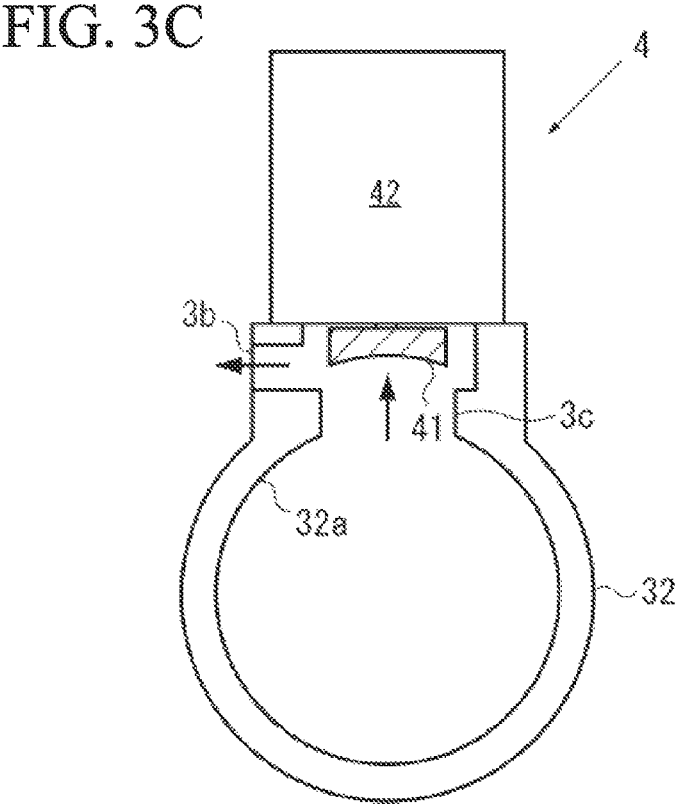
FIG. 3C is a cross-sectional view of the recirculation valve illustrated in FIG. 1 in an open state.

By the actuator 42, the recirculation valve 4 is arranged in such a manner that the valve body 41 can be fitted in and inserted into the branch hole 3c as illustrated in FIG. 3B and in such a manner that the valve body 41 can be away from the branch hole 3c and the branch hole 3c can communicate with the recirculation conduit 3b as illustrated in FIG. 3C. In the embodiment, a state where the valve body 41 is fitted in the branch hole 3c is referred to as the closed state, and a state where the valve body 41 is away from the branch hole 3c is referred to as the open state. The actuator 42 supports the valve body 41 using a driving shaft 42a, and is capable of moving the valve body 41 in a longitudinal direction of the driving shaft 42a based on the control by the electronic control unit 104.

The valve body 41 (component illustrated with the oblique lines in FIGS. 3A to 3C) is formed with the inner surface 41a so as to form one curved surface along with the inner wall 32a of the scroll section 32 in, for example, the closed state. That is, the inner surface 41a of the valve body 41 is formed so as to form a curved surface continuing from the inner wall 32a of the scroll section 32 in the closed state. In this manner, by forming the inner surface 41a along the inner wall 32a of the scroll section 32 in the closed state, a recessed space in the scroll section 32 can be buried to prevent pressure loss and foreign material accumulation, pressure loss can be suppressed, and it is possible to inhibit the recirculation conduit from being mixed with foreign material.

Figure 4:
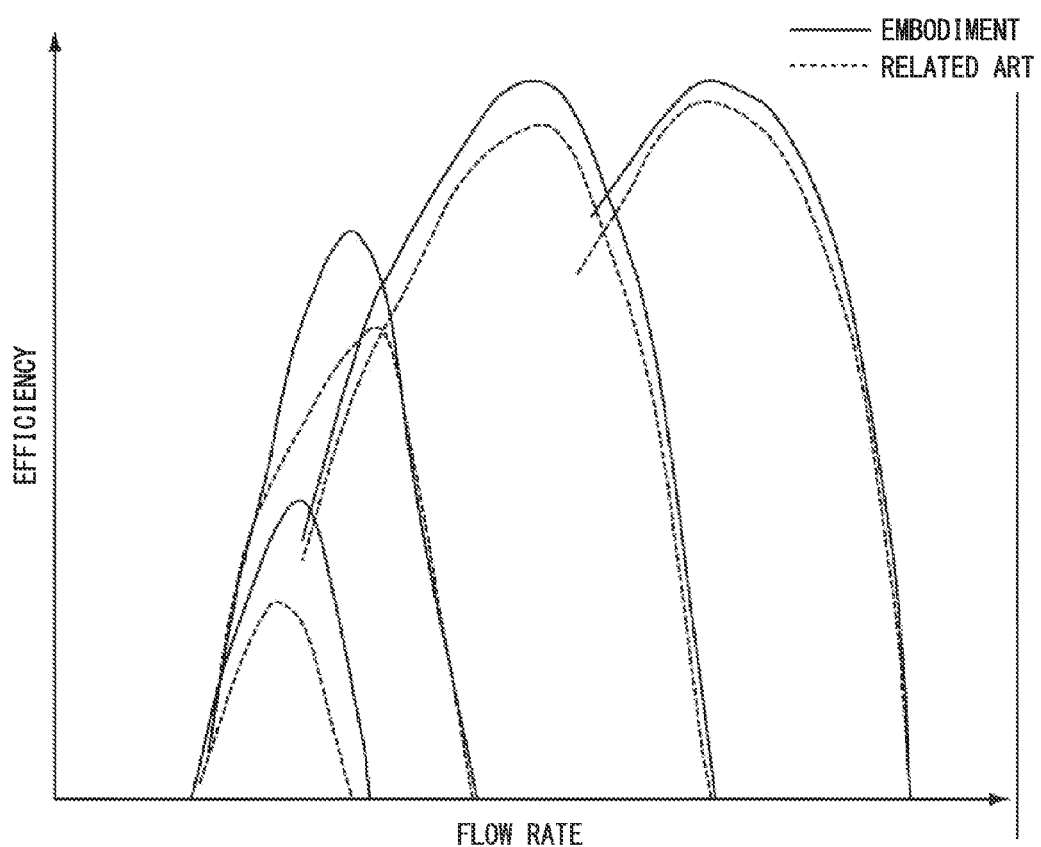
FIG. 4 is a view in which the efficiency of the turbocharger illustrated in FIG. 1 with respect to a flow rate and the efficiency of a turbocharger according to the related art with respect to a flow rate are compared to each other.

Herein, FIG. 4 is a view in which the efficiency of the turbocharger 1 according to the first embodiment and the efficiency of a turbocharger according to the related art are compared to each other to illustrate the difference in efficiency. In FIG. 4, the horizontal axis illustrates a flow rate of the compressor 3, and the vertical axis illustrates the efficiency of the turbocharger 1. Also, the solid line and the dashed line illustrate the embodiment and the related art, respectively. It can be easily understood from FIG. 4 that the turbocharger 1 according to the embodiment has higher efficiency than the turbocharger according to the related art regardless of the flow rate. In particular, the former is more effective in a case where the flow rate is relatively low. In a case where the scroll section 32 has a recess, the pressure loss caused by the recess is larger when the flow rate is low, and thus it is clearly shown that the pressure loss is improved by the embodiment.

Hereinafter, another embodiment of the present invention will be described with reference to FIGS. 5A to 5D.

Figure 5A:
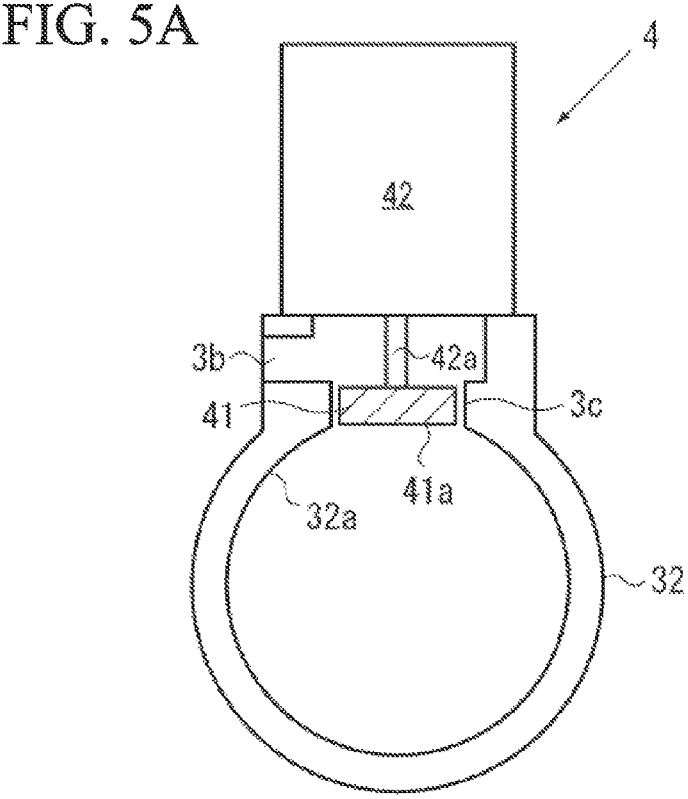
FIG. 5A is an explanatory view of a second embodiment of a recirculation valve according to another embodiment of the present invention.

As illustrated in FIG. 5A, in the recirculation valve 4 according to a second embodiment of the present invention, the inner surface 41a of the valve body 41 forms a flat surface along the inner wall of the scroll section 32 in the closed state. The second embodiment has substantially the same effect as the first embodiment, and processing can be facilitated when the valve body 41 is manufactured and the costs can be reduced.

Figure 5B:
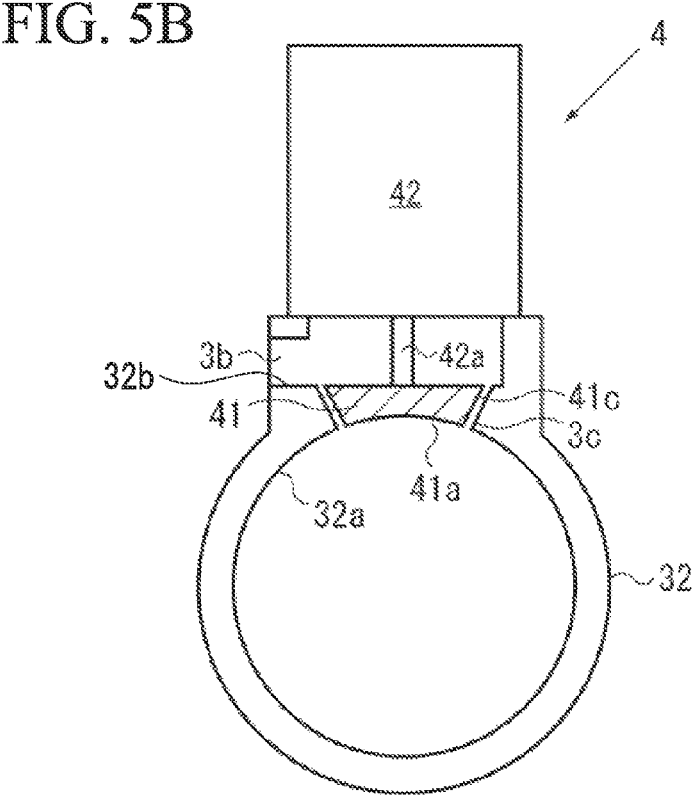
FIG. 5B is an explanatory view of a fourth embodiment of a recirculation valve according to another embodiment of the present invention.
Figure 5C:
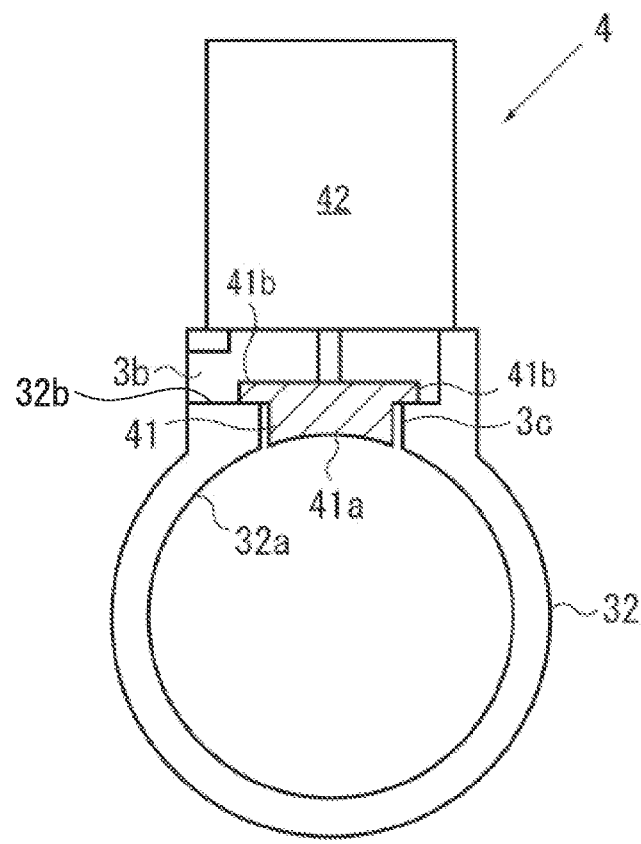
FIG. 5C is an explanatory view of a third embodiment of a recirculation valve according to another embodiment of the present invention.

As illustrated in FIG. 5C, the recirculation valve 4 according to a third embodiment has a flange portion 41b where the valve body 41 is locked to the outer wall 32b of the scroll section 32 in the closed state. In the recirculation valve 4 according to the first embodiment, it is necessary to set the stroke amount of the driving shaft 42a in advance so as to properly switch between the open state and the closed state. With respect thereto, according to the recirculation valve 4 of the third embodiment, the closed state can be entered by bringing the flange portion 41b into contact with and by locking the flange portion to the outer wall 32b of the scroll section 32.

Therefore, by arranging a pressure sensor and a load sensor in the recirculation valve 4, it is possible to stop the actuator 42 after detecting that the flange portion 41b of the valve body 41 is in contact with the outer wall 32b of the scroll section 32, and it is possible to easily control the stroke amount of the driving shaft 42a.

As illustrated in FIG. 5B, the recirculation valve 4 according to a fourth embodiment has a conical surface where the diameter of the branch hole 3c increases from the inner wall 32a of the scroll section 32 toward the outer wall 32b, and the valve body 41 has an inclined surface 41c that corresponds to the conical surface. The inclined surface 41c is formed by the similarly shaped conical surface so as to fit the shape of the branch hole 3c. According to the recirculation valve 4 of the fourth embodiment, it is possible to form a sufficient gap between the valve body 41 and the branch hole 3c with the small amount of movement of the valve body 41, to reduce the stroke amount of the driving shaft 42a when switching between the open state and the closed state, and to improve the speed of response.

Also, according to the recirculation valve 4 of the fourth embodiment, it is possible to prevent the valve body 41 from protruding in the scroll section 32 by mistake by bringing the conical surface of the branch hole 3c into contact with the inclined surface 41c of the valve body 41, and thus the same effect can be achieved as the above-described flange portion 41b.

Figure 5D:
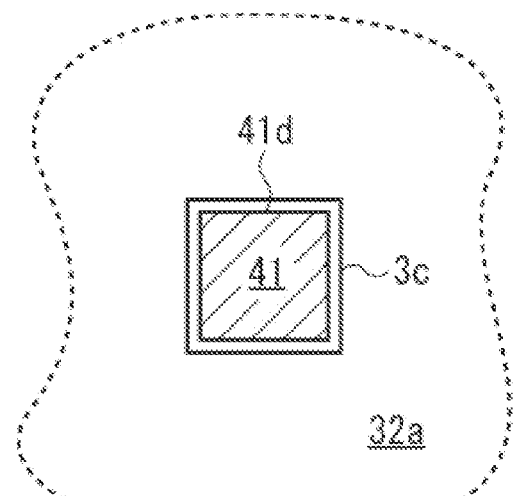
FIG. 5D is an explanatory view of a fifth embodiment of a recirculation valve according to another embodiment of the present invention.

As illustrated in FIG. 5D, the recirculation valve 4 according to a fifth embodiment has a rectangular columnar surface that extends from the inner wall 32a of the scroll section 32 toward the outer wall 32b, and the valve body 41 has a side surface 41d that corresponds to the columnar surface. FIG. 5D illustrates a state where the branch hole 3c and the valve body 41 are viewed from inside the scroll section 32.

The recirculation valve 4 according to the first embodiment illustrated in FIG. 1 has a circular columnar surface where the branch hole 3c extends from the inner wall 32a of the scroll section 32 toward the outer wall 32b, and the valve body 41 has the side surface that corresponds to the columnar surface. In the first embodiment, in a state where the valve body 41 rotates about the driving shaft 42a, there is a possibility that the inner surface 41a might have a deviated phase so as not to be the curved surface continuing from the inner wall 32a of the scroll section 32. Therefore, in order to ensure the continuity of the curved surface, it is preferable that the phase of the valve body 41 be controlled or the valve body 41 not rotate about the driving shaft 42a.

According to the recirculation valve 4 of the above-described fifth embodiment, the branch hole 3c has a rectangular cross section, and thus it is possible to forcibly match the phase if the valve body 41 is fitted in the branch hole 3c, and it is possible to easily form the curved surface continuing from the inner wall 32a of the scroll section 32. Also, since the valve body 41 is reliably fitted in the branch hole 3c, a tip end portion of the valve body 41 may have a tapered shape that has a decreasing diameter, or a pyramid surface may be formed in the branch hole 3c and the valve body 41 may be formed to have a shape corresponding to the pyramid surface as is the case with the branch hole 3c described in the fourth embodiment. Even in a case where the branch hole 3c has an oblong cross section instead of the rectangular cross section, the same effect as the fifth embodiment is achieved by configuring the recirculation valve 4 in the same manner.

Hereinafter, a sixth embodiment of the present invention will be described with reference to FIGS. 6A and 6B. Like reference numerals are used to refer to the same elements as illustrated in FIGS. 1 to 3C, and a redundant description thereof will be omitted here.

Figure 6A:
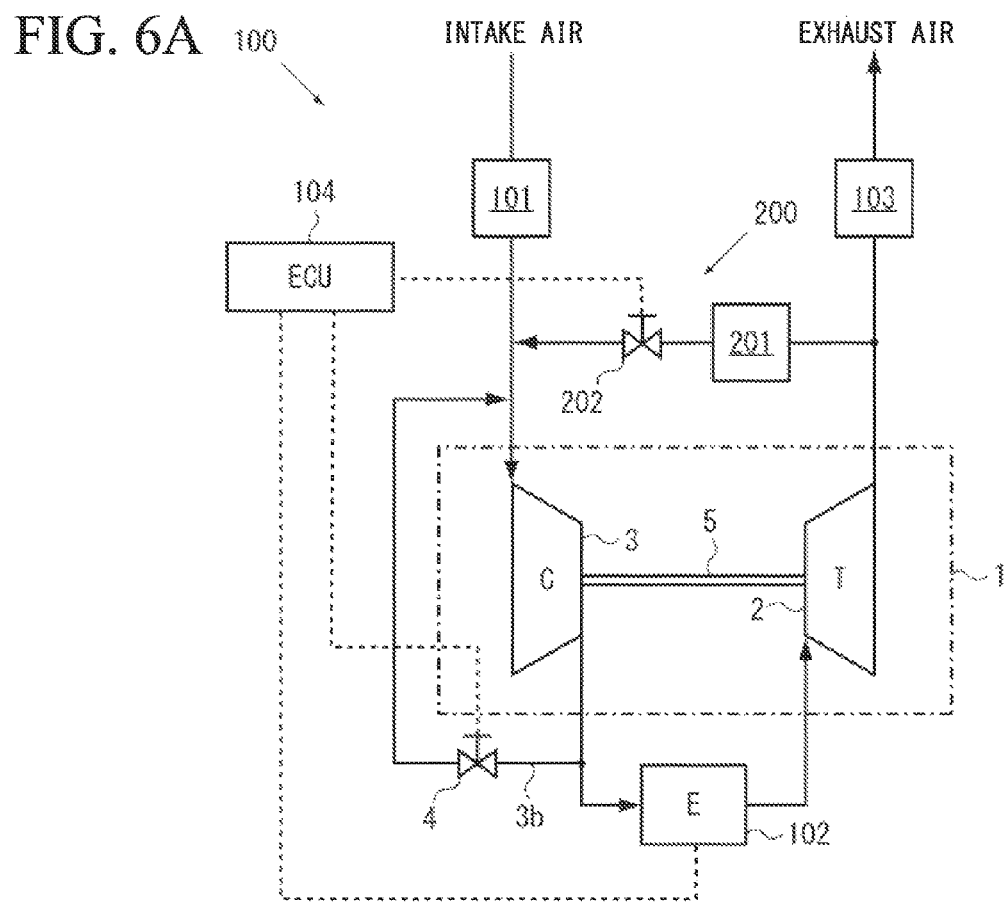
FIG. 6A is a configuration diagram of an engine driving system including a turbocharger according to a sixth embodiment of the present invention.

The engine driving system 100 including the turbocharger 1 according to the sixth embodiment of the present invention is mounted with an EGR system 200, and, as illustrated in FIG. 6A, includes the air cleaner 101 that removes the fine foreign material in the intake air, the turbocharger 1 that compresses the intake air, the engine 102 that is driven by the compressed air and fuel, the after-treatment device 103 that removes the harmful components generated in and discharged from the combustion chamber of the engine, and the electronic control unit (ECU) 104 that controls the turbocharger 1, the engine 102, and the EGR system 200.

Also, the EGR system 200 has an EGR cooler 201 that lowers the temperature of the exhaust gas, and an EGR valve 202 that returns some of discharge gas discharged from the engine 102 to the air inlet 33 side of the compressor 3. The EGR valve 202 is opened and closed based on the control by the electronic control unit 104. The configuration and operation of the EGR system 200 is the same as EGR systems in the related art, and thus a redundant description will be omitted here.

Figure 6B:
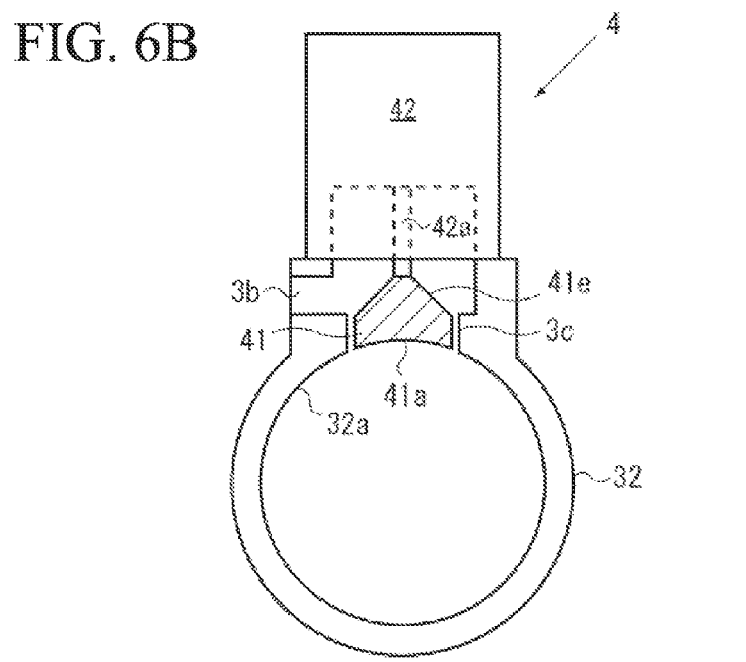
FIG. 6B is a cross-sectional view of a recirculation valve according to the sixth embodiment of the present invention.

As illustrated in FIG. 6B, in the recirculation valve 4 according to the sixth embodiment, the valve body 41 has a tapered portion 41e on a back surface, the diameter thereof increasing from the driving shaft 42a of the actuator 42 toward an outer edge portion of the valve body 41. As described above, in a case where the EGR system 200 or the like is provided, an intake pipe on an upstream side of the compressor 3 contains not only clean air from which dust and the like is removed by the air cleaner 101 but also gas containing foreign materials such as blow-by gas and EGR gas. The blow-by gas is gas that flows into the intake pipe via an oil separator from an engine main body, and contains oil mist and metal powder. The EGR gas is gas that flows into the intake pipe through the EGR system from an exhaust pipe, and contains soot and unburnt gas.

In this manner, the air that is taken in by the compressor 3 contains various foreign materials and moisture. In a case where the recirculation valve 4 is operated, the air containing the foreign material and moisture also flows into the recirculation conduit 3b. As a result, there is a possibility that the foreign materials might stick to the back surface of the valve body 41 and the moisture might be attached in a frozen state. In a case where the recirculation valve 4 is operated in that state, there is a possibility that the valve body 41 might not be sufficiently opened due to the foreign materials and that the foreign material might be crushed or dropped out during the opening and closing of the valve body 41 to flow into the recirculation conduit 3b. In a case where the foreign material is a relatively large lump, there is a concern that the impeller 31 of the compressor 3 might be damaged.

Herein, by forming the tapered portion 41e on the flat surface of the valve body 41, it is possible to prevent the foreign material from piling up and to prevent the moisture from accumulating, and thus it is possible to easily prevent the foreign materials and ice from sticking. Also, in a case where the valve body 41 is in the closed state and the foreign material clogs the space between the valve body 41 and the branch hole 3c thereby sticking them together to impede the opening and closing of the valve body 41, the valve body 41 may be capable of rotating about the driving shaft 42a in the closed state so that the valve body 41 is opened and closed by physically releasing the sticking of the valve body 41. In this case, as it is easily conceivable from FIG. 1, the actuator 42 may rotate the driving shaft 42*a*. As a result, the valve body 41 rotates around the driving shaft 42*a*. Here, as is obvious from the above-described embodiment, when the valve body 41 can rotate around the driving shaft 42*a* in the closed state, it may be necessary to avoid employing a structure where the valve body 41 does not rotate around the driving shaft 42*a* as shown in FIG. 5D. Furthermore, the valve body 41 may be capable of rotating about the driving shaft 42*a* in the closed state when the valve body 42 becomes the closed state while rotating by way of a threading structure in the driving shaft 42*a*, for example.

The present invention is not limited to the above-described embodiments but the above-described embodiments may be appropriately combined with each other. Also, various changes may be made without departing from the scope of the present invention.

INDUSTRIAL APPLICABILITY

According to the recirculation valve and the turbocharger of the present invention, the recessed space in the scroll section can be buried to prevent the pressure loss and foreign material accumulation, pressure loss can be suppressed, and it is possible to inhibit the recirculation conduit from being mixed with the foreign materials. Therefore, the operating efficiency can be improved.

REFERENCE SIGNS LIST

1 TURBOCHARGER
2 EXHAUST GAS TURBINE
3 COMPRESSOR
3*a* COMPRESSOR HOUSING
3*b* RECIRCULATION CONDUIT
3*c* BRANCH HOLE
4 RECIRCULATION VALVE
21 MOVING BLADE
31 IMPELLER
32 SCROLL SECTION
32*a* INNER WALL
32*b* OUTER WALL
41 VALVE BODY
41*a* INNER SURFACE
41*b* FLANGE PORTION
41*c* INCLINED SURFACE
41*d* SIDE SURFACE
41*e* TAPERED PORTION
42 ACTUATOR
42*a* DRIVING SHAFT
102 ENGINE

The invention claimed is:

1. A recirculation valve configured to divert a portion of compressed air in a scroll section to an upstream side of the scroll section via a recirculation conduit in an open state and send the compressed air in the scroll section to a downstream side in a closed state, the recirculation valve comprising:
a valve body configured to fit in a branch hole in which the scroll section is configured to communicate with the recirculation conduit; and
an actuator configured to support the valve body using a driving shaft and move the valve body between the closed state where the valve body is fitted in the branch hole and the open state where the valve body is spaced apart from the branch hole,
wherein the valve body is configured to form an inner surface along an inner wall of the scroll section in the closed state, and the valve body is capable of rotating about the driving shaft in the closed state.

2. The recirculation valve according to claim 1, wherein the inner surface of the valve body is configured to form one curved surface along with the inner wall of the scroll section in the closed state.

3. A turbocharger comprising the recirculation valve according to claim 2, the turbocharger comprising:
an exhaust gas turbine configured to rotate a moving blade with exhaust gas supplied from an engine; and
a compressor configured to take in air with an impeller that is coaxially connected to the moving blade,
wherein a compressor housing that is configured to form an outer shell of the compressor has a scroll section which is formed in a spiral shape about an axis of rotation of the impeller.

4. The recirculation valve according to claim 1, wherein the inner surface of the valve body is configured to form a flat surface along the inner wall of the scroll section in the closed state.

5. A turbocharger comprising the recirculation valve according to claim 4, the turbocharger comprising:
an exhaust gas turbine configured to rotate a moving blade with exhaust gas supplied from an engine; and
a compressor configured to take in air with an impeller that is coaxially connected to the moving blade,
wherein a compressor housing that is configured to form an outer shell of the compressor has a scroll section which is formed in a spiral shape about an axis of rotation of the impeller.

6. The recirculation valve according to claim 1, wherein the valve body includes a flange portion configured to be locked to an outer wall of the scroll section in the closed state.

7. A turbocharger comprising the recirculation valve according to claim 6, the turbocharger comprising:
an exhaust gas turbine configured to rotate a moving blade with exhaust gas supplied from an engine; and
a compressor configured to take in air with an impeller that is coaxially connected to the moving blade,
wherein a compressor housing that is configured to form an outer shell of the compressor has a scroll section which is formed in a spiral shape about an axis of rotation of the impeller.

8. The recirculation valve according to claim 1, wherein the branch hole includes a conical surface whose diameter increases from the inner wall of the scroll section toward the outer wall, and the valve body includes an inclined surface that corresponds to the conical surface.

9. A turbocharger comprising the recirculation valve according to claim 8, the turbocharger comprising:
an exhaust gas turbine configured to rotate a moving blade with exhaust gas supplied from an engine; and
a compressor configured to take in air with an impeller that is coaxially connected to the moving blade,
wherein a compressor housing that is configured to form an outer shell of the compressor has a scroll section which is formed in a spiral shape about an axis of rotation of the impeller.

10. The recirculation valve according to claim 1, wherein the branch hole includes a circular or rectangular columnar surface configured to extend from the inner wall of the scroll section toward the outer wall, and the valve body includes a side surface that corresponds to the columnar surface.

11. A turbocharger comprising the recirculation valve according to claim 10, the turbocharger comprising:
   an exhaust gas turbine configured to rotate a moving blade with exhaust gas supplied from an engine; and
   a compressor configured to take in air with an impeller that is coaxially connected to the moving blade,
   wherein a compressor housing that is configured to form an outer shell of the compressor has a scroll section which is formed in a spiral shape about an axis of rotation of the impeller.

12. The recirculation valve according to claim 1,
   wherein the valve body includes a tapered portion on a back surface, the diameter of the tapered portion increasing from a driving shaft of the actuator toward an outer edge portion of the valve body.

13. A turbocharger comprising the recirculation valve according to claim 12, the turbocharger comprising:
   an exhaust gas turbine configured to rotate a moving blade with exhaust gas supplied from an engine; and
   a compressor configured to take in air with an impeller that is coaxially connected to the moving blade,
   wherein a compressor housing that is configured to form an outer shell of the compressor has a scroll section which is formed in a spiral shape about an axis of rotation of the impeller.

14. A turbocharger comprising the recirculation valve according to claim 1, the turbocharger comprising:
   an exhaust gas turbine configured to rotate a moving blade with exhaust gas supplied from an engine; and
   a compressor configured to take in air with an impeller that is coaxially connected to the moving blade,
   wherein a compressor housing that is configured to form an outer shell of the compressor has a scroll section which is formed in a spiral shape about an axis of rotation of the impeller.

* * * * *